(12) United States Patent
Wen et al.

(10) Patent No.: US 11,442,961 B2
(45) Date of Patent: Sep. 13, 2022

(54) ACTIVE TRANSACTION LIST SYNCHRONIZATION METHOD AND APPARATUS

(71) Applicant: Huawei Technologies Co., Ltd., Shenzhen (CN)

(72) Inventors: Jijun Wen, Shenzhen (CN); Bo Shang, Shenzhen (CN); Wei Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 418 days.

(21) Appl. No.: 16/552,833

(22) Filed: Aug. 27, 2019

(65) Prior Publication Data
US 2019/0384775 A1   Dec. 19, 2019

Related U.S. Application Data

(63) Continuation of application No. PCT/CN2017/105561, filed on Oct. 10, 2017.

(30) Foreign Application Priority Data

Feb. 28, 2017   (CN) .......................... 201710115023.0

(51) Int. Cl.
*G06F 16/27* (2019.01)
*G06F 16/23* (2019.01)
*G06F 11/14* (2006.01)

(52) U.S. Cl.
CPC ........ *G06F 16/273* (2019.01); *G06F 16/2379* (2019.01)

(58) Field of Classification Search
CPC ..... G06F 16/273; G06F 16/2379; G06F 11/14
See application file for complete search history.

(56) References Cited

U.S. PATENT DOCUMENTS 5,832,516 A * 11/1998 Bamford ................. G06F 16/00
8,639,677 B2   1/2014 Pruet, III
(Continued)

FOREIGN PATENT DOCUMENTS

CN   101251814 A   8/2008
CN   101488134 A   7/2009
(Continued)

OTHER PUBLICATIONS

Helland, P., et al., "Group Commit Timers and High Volume Transaction Systems," XP019179142, High Performance Transactions Systems, Sep. 28, 1987, pp. 301-329.
(Continued)

*Primary Examiner* — Robert W Beausoliel, Jr.
*Assistant Examiner* — Mohammad S Bhuyan
(74) *Attorney, Agent, or Firm* — Conley Rose, P.C.

(57) ABSTRACT

An active transaction list synchronization method and apparatus comprising a first node that records, in a transaction list incremental log buffer, a transaction list incremental log that is obtained after last active transaction list synchronization, where the transaction list incremental log indicates a change of a transaction recorded in an active transaction list of the first node and includes an added-transaction log and a committed-transaction log, wherein the added-transaction log indicates a transaction is added to the active transaction list, wherein the committed-transaction log indicates a transaction is deleted from the active transaction list. When performing group commit on transactions recorded in the committed-transaction log, the first node sends the transaction list incremental log to at least one second node.

20 Claims, 10 Drawing Sheets

(56) References Cited

U.S. PATENT DOCUMENTS

| | | | |
|---|---|---|---|
| 9,280,591 B1 | 3/2016 | Kharatishvili et al. | |
| 2004/0220934 A1* | 11/2004 | Dearing | G06F 9/466 |
| 2009/0217274 A1 | 8/2009 | Corbin et al. | |
| 2011/0314244 A1 | 12/2011 | Sodhi et al. | |
| 2012/0150829 A1* | 6/2012 | Bourbonnais | G06F 16/273 |
| | | | 707/703 |
| 2014/0379991 A1 | 12/2014 | Lomet et al. | |
| 2015/0254264 A1 | 9/2015 | Yu et al. | |
| 2015/0261626 A1 | 9/2015 | Wen et al. | |
| 2015/0293966 A1 | 10/2015 | Cai et al. | |
| 2016/0092358 A1* | 3/2016 | Bair | G06F 3/0644 |
| | | | 711/141 |
| 2016/0147778 A1 | 5/2016 | Schreter et al. | |
| 2016/0378818 A1* | 12/2016 | Marcotte | G06F 16/183 |
| | | | 707/703 |

FOREIGN PATENT DOCUMENTS

| | | | |
|---|---|---|---|
| CN | 101692226 A | 4/2010 | |
| CN | 102289393 A | 12/2011 | |
| CN | 102891849 A | 1/2013 | |
| CN | 103377100 A | 10/2013 | |
| CN | 103729442 A | 4/2014 | |
| CN | 103942252 A | 7/2014 | |
| CN | 104967658 A | 10/2015 | |
| CN | 105408895 A | 3/2016 | |
| CN | 105975579 A | 9/2016 | |
| CN | 106462594 A | 2/2017 | |

OTHER PUBLICATIONS

Machine Translation and Abstract of Chinese Publication No. CN101488134, Jul. 22, 2009, 12 pages.

Machine Translation and Abstract of Chinese Publication No. CN104967658, Oct. 7, 2015, 7 pages.

Machine Translation and Abstract of Chinese Publication No. CN105975579, Sep. 28, 2016, 11 pages.

Foreign Communication From A Counterpart Application, PCT Application No. PCT/CN2017/105561, English Translation of International Search Report dated Dec. 15, 2017, 2 pages.

Foreign Communication From A Counterpart Application, PCT Application No. PCT/CN2017/105561, English Translation of Written Opinion dated Dec. 15, 2017, 4 pages.

Jianling, S., et al. "Page Server of Engineering Database Management System OSCAR," Journal of Computer Aided Design and Computer Graphics, Dec. 2003, pp. 1526-1530. with English abstract.

* cited by examiner

ACTIVE TRANSACTION LIST SYNCHRONIZATION METHOD AND APPARATUS

CROSS-REFERENCE TO RELATED APPLICATIONS

The present application is a continuation application of International Application No. PCT/CN2017/105561, filed on Oct. 10, 2017, which claims priority to Chinese Patent Application No. 201710115023.0, filed on Feb. 28, 2017. The disclosures of the aforementioned applications are hereby incorporated by reference in their entireties.

TECHNICAL FIELD

The present application relates to the field of database technologies, and in particular, to an active transaction list synchronization method and apparatus.

BACKGROUND

A transaction is a user-defined sequence of database operations in a database system and is an indivisible unit of work, and either all of these operations are performed or none of these operations is performed. An active transaction list is used to record a transaction identification (ID) of a not-yet-committed transaction. Nodes in a distributed database cluster need to synchronize active transaction lists with each other in order to ensure consistency of databases.

In other approaches, when performing group commit, a transaction-executing node sends an active transaction list of the transaction-executing node to other nodes in a database cluster such that these nodes synchronize active transaction lists of the nodes with the active transaction list of the transaction-executing node.

However, there are usually a large quantity of concurrent transactions on a node, and therefore an active transaction list of the node becomes quite large. When active transaction list synchronization is performed using a network, not only a large quantity of transmission resources are consumed, but also a relatively long time is consumed for transmission of an active transaction list. As a result, there is a relatively large delay of active transaction list synchronization between nodes, and efficiency of a database system is reduced.

SUMMARY

The present application provides an active transaction list synchronization method and apparatus in order to resolve a problem with other approaches that a data transmission amount is relatively large and a transmission time is relatively long when active transaction list synchronization is performed between nodes.

According to a first aspect, the present application provides an active transaction list synchronization method. The method can be applied to a cluster-based database system with a one-primary-multi-secondary architecture including one primary node and a plurality of secondary nodes, or a cluster-based database system with a multi-write architecture including one coordinator node and a plurality of data nodes. The method may be executed by the primary node in the cluster-based database system with a one-primary-multi-secondary architecture, or may be executed by the coordinator node in the cluster-based database system with a multi-write architecture. In the method, a first node (the primary node or the coordinator node) records, in a transaction list incremental log buffer, a transaction list incremental log obtained after last active transaction list synchronization. The transaction list incremental log is used to indicate a change of a transaction recorded in an active transaction list of the first node, and includes an added-transaction log indicating that a transaction is added to the active transaction list and a committed-transaction log indicating that a transaction is deleted from the active transaction list. The active transaction list is used to record a not-yet-committed transaction. Then, when performing group commit on transactions recorded in the committed-transaction log, the first node sends, to a second node different from the first node in a database cluster, the transaction list incremental log recorded in the transaction list incremental log buffer. There may be one or more second nodes. When the first node is the primary node, the second node is the secondary node, or when the first node is the coordinator node, the second node is the data node. After receiving the transaction list incremental log sent by the first node, the second node updates a locally stored active transaction list according to the transaction list incremental log.

In the technical solution, the first node sends, to the second node, the transaction list incremental log obtained when the first node performs group commit, the second node may update, according to the transaction list incremental log, the active transaction list of the second node to be the same as the active transaction list of the first node. A quantity of transaction list incremental logs obtained when group commit is performed is usually far less than a quantity of active transactions in the active transaction list of the first node. Therefore, a size of a transaction list incremental log is far less than a size of the entire active transaction list. Active transaction list synchronization is implemented by transmitting the transaction list incremental log, thereby reducing an occupied transmission resource, a transmission time, and a delay of active transaction list synchronization.

In an optional implementation of the first aspect, the first node configures the transaction list incremental log buffer to be protected using a redo log lock. In a process of obtaining the redo log lock specific to an added transaction and writing a redo log, the first node may further use the redo log lock to lock the transaction list incremental log buffer, and write an added-transaction log into the transaction list incremental log buffer. Therefore, in the process of writing the added-transaction log into the transaction list incremental log buffer by the first node, no additional lock overheads are caused. In a process of obtaining a redo log lock specific to a committed transaction and writing a redo log, the first node may further use the redo log lock to lock the transaction list incremental log buffer, and write a committed-transaction log into the transaction list incremental log buffer. Therefore, in the process of writing the committed-transaction log into the transaction list incremental log buffer by the first node, no additional lock overheads are caused, either. In the technical solution, the first node uses an existing redo log lock when recording the transaction list incremental log such that no additional lock overheads are caused. This can effectively mitigate lock permission preemption during recording of the transaction list incremental log, and improve a transaction throughput.

In an optional implementation of the first aspect, when the transaction list incremental log buffer is protected using the redo log lock, the first node first obtains the redo log lock, locks the transaction list incremental log buffer, copies the transaction list incremental log in the transaction list incremental log buffer into a buffer that is in a memory and that is not protected using a lock, and sends, to the second node, the transaction list incremental log in the buffer that is not protected using a lock. In the process of sending, to the second node, the transaction list incremental log from the buffer that is not protected using a lock, the redo log lock is not occupied. According to the solution, occupancy of the redo log lock when the transaction list incremental log is sent can be effectively reduced. This improves a transaction throughput.

In an optional implementation of the first aspect, after copying, according to the redo log lock, the transaction list incremental log in the transaction list incremental log buffer into the buffer that is not protected using a lock, the first node resets the transaction list incremental log buffer such that the first node can record in time, in the transaction list incremental log buffer, a transaction list incremental log indicating that a transaction is added and a transaction list incremental log indicating that a transaction is committed, where the transaction list incremental logs are obtained after group commit is performed. This improves a transaction throughput and transaction processing efficiency.

In an optional implementation of the first aspect, before sending the transaction list incremental log to the at least one second node, the first node deletes, from the transaction list incremental log, an added-transaction log and a committed-transaction log that are recorded for a same transaction. When the first node deletes the added-transaction log and the committed-transaction log that are recorded for a same transaction, active transaction list synchronization between nodes is not affected. In addition, a log transmission amount can be significantly reduced, transmission resource consumption is reduced, and a time consumed for transaction list synchronization is shortened.

In an optional implementation of the first aspect, if a total size of the transaction list incremental log is not greater than a preset threshold and is a relatively small value, the first node may not perform point retrieval on the added-transaction log and the committed-transaction log that are recorded for a same transaction. This reduces calculation resource consumption. On the contrary, the first node performs, only when the total size of the transaction list incremental log is greater than the preset threshold and is a relatively large value, point retrieval on the added-transaction log and the committed-transaction log that are recorded for a same transaction, and deletes the added-transaction log and the committed-transaction log that are recorded for a same transaction in order to reduce a log transmission amount.

In an optional implementation of the first aspect, after the second node is added to the database cluster to which the first node belongs, the first node sends the current active transaction list of the first node to the second node such that the second node stores the active transaction list in order to implement initialization of an active transaction list of the second node.

According to a second aspect, the present application provides an active transaction list synchronization method. The method can be applied to a cluster-based database system with a one-primary-multi-secondary architecture including one primary node and a plurality of secondary nodes, or a cluster-based database system with a multi-write architecture including one coordinator node and a plurality of data nodes. The method may be executed by a secondary node in the cluster-based database system with a one-primary-multi-secondary architecture, or may be executed by a data node in the cluster-based database system with a multi-write architecture. In the method, a second node (the secondary node or the data node) receives a transaction list incremental log obtained after last active transaction list synchronization and sent by a first node (when the second node is the secondary node, the first node is the primary node, or when the second node is the data node, the first node is the coordinator node). The transaction list incremental log is used to indicate a change of a transaction recorded in an active transaction list of the first node and includes an added-transaction log indicating that a transaction is added to the active transaction list and a committed-transaction log indicating that a transaction is deleted from the active transaction list, and the active transaction list is used to record a not-yet-committed transaction, and the second node updates a local active transaction list according to the transaction list incremental log.

In the technical solution, the first node sends, to the second node, the transaction list incremental log obtained when the first node performs group commit, the second node may update, according to the transaction list incremental log, the active transaction list of the second node to be the same as the active transaction list of the first node. A quantity of transaction list incremental logs obtained when group commit is performed is usually far less than a quantity of active transactions in the active transaction list of the first node. Therefore, a size of a transaction list incremental log is far less than a size of the entire active transaction list. Active transaction list synchronization is implemented by transmitting the transaction list incremental log, thereby reducing an occupied transmission resource, a transmission time, and a delay of active transaction list synchronization.

In an optional implementation of the second aspect, in the process of updating the local active transaction list according to the transaction list incremental log by the second node, the second node adds a first transaction to the active transaction list if the transaction list incremental log includes a log indicating that the first transaction is added but does not include a log indicating that the first transaction is committed, and the second node deletes a second transaction from the active transaction list if the active transaction list includes the second transaction and the transaction list incremental log includes a log indicating that the second transaction is committed.

According to a third aspect, the present application provides an active transaction list synchronization apparatus, where the apparatus is configured to execute the method in the first aspect or any possible implementation of the first aspect. In an embodiment, the apparatus includes a module configured to execute the method in the first aspect or any possible implementation of the first aspect.

According to a fourth aspect, the present application provides an active transaction list synchronization apparatus, where the apparatus is configured to execute the method in the second aspect or any possible implementation of the second aspect. In an embodiment, the apparatus includes a module configured to execute the method in the second aspect or any possible implementation of the second aspect.

According to a fifth aspect, the present application provides an active transaction list synchronization device, where the device is configured to execute the method in the first aspect or any possible implementation of the first aspect. The device includes a processor, a memory, and a communications interface. The memory includes a transaction list incremental log buffer, and the transaction list incremental log buffer is used to record a transaction list incremental log. The communications interface is configured to send the transaction list incremental log to a second node. The processor is communicatively connected to both the memory and the communications interface, and is configured to execute the method in the first aspect or any possible implementation of the first aspect using the memory and the communications interface.

According to a sixth aspect, the present application provides an active transaction list synchronization device, where the device is configured to execute the method in the second aspect or any possible implementation of the second aspect. The device includes a processor, a memory, and a communications interface. The memory is configured to store an active transaction list. The communications interface is configured to receive a transaction list incremental log sent by a first node. The processor is communicatively connected to both the memory and the communications interface, and is configured to execute the method in the second aspect or any possible implementation of the second aspect using the memory and the communications interface.

According to a seventh aspect, the present application further provides a computer-readable storage medium configured to store a computer software instruction for executing a function in the first aspect and any design of the first aspect, where the computer software instruction includes a program designed to execute the method in the first aspect and any design of the first aspect.

According to an eighth aspect, the present application further provides a computer-readable storage medium configured to store a computer software instruction for executing a function in the second aspect and any design of the second aspect, where the computer software instruction includes a program designed to execute the method in the second aspect and any designs of the second aspect.

In the present application, based on the implementations provided in the foregoing aspects, the implementations may be further combined to provide more implementations.

DESCRIPTION OF EMBODIMENTS

To make the objectives, technical solutions, and advantages of the present application clearer, the following further describes the present application in detail with reference to the accompanying drawings.

The present application provides an active transaction list synchronization method and apparatus in order to resolve a problem with other approaches that a relatively long time is consumed when active transaction list synchronization is performed between nodes. The method and the apparatus are based on a same inventive concept. Because principles of resolving the problem according to the method and the apparatus are similar, mutual reference may be made to implementations of the apparatus and the method, and repeated content is not described again.

"A plurality of" in the present application means two or more. In addition, it should be understood that, in the description of the present application, terms such as "first" and "second" are merely intended for a purpose of description, and shall not be understood as an indication or implication of relative importance or indication or implication of an order.

Figure 1:
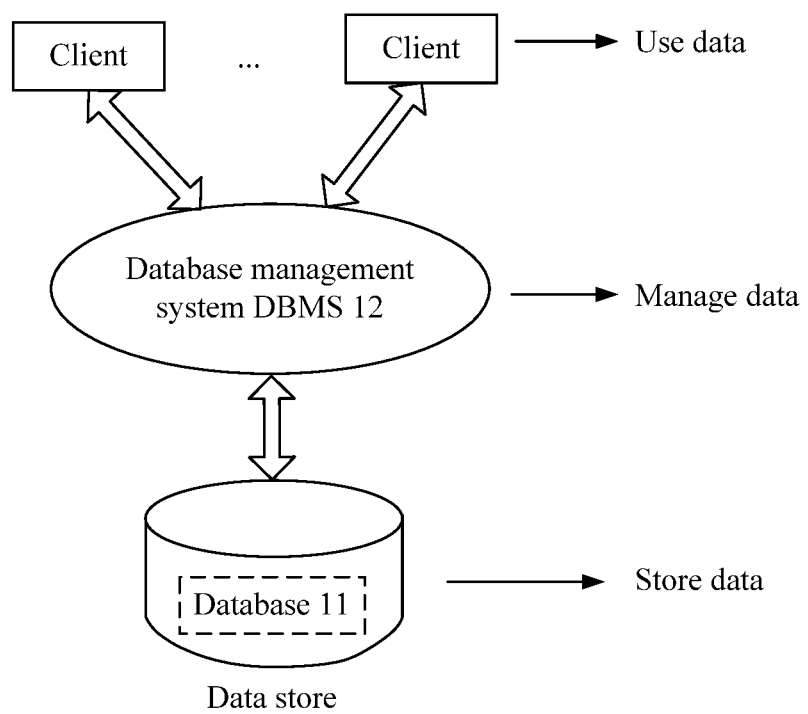
FIG. 1 is a schematic diagram of an architecture of a database system.

An architecture of a database system is shown in FIG. 1, the database system includes a database 11 and a database management system (DBMS) 12.

The database 11 refers to a collection of organized data stored in a data store for a long term, that is, a collection of related data organized, stored, and used according to a specific data model. For example, the database 11 may include one or more data tables.

The DBMS 12 is configured to create, use, and maintain the database 11, and perform centralized management and control on the database 11 in order to ensure security and integrity of the database 11. A user may access data in the database 11 using the DBMS 12, and a database administrator may also maintain the database using the DBMS 12. The DBMS 12 provides a plurality of functions such that a plurality of applications and user equipments use different methods to create, modify, and query the database at a same moment or different moments. The applications and the user equipments may be collectively referred to as clients. The DBMS 12 may provide the following several functions (1) data definition function, where the DBMS 12 provides a data definition language (DDL) to define a structure of a database, and the DDL is used to describe a database framework, which can be stored in a data dictionary, (2) data access function, where the DBMS 12 provides a data manipulation language (DML) to implement basic data access operations on data in the database, such as retrieval, insertion, modification, and deletion, (3) database running management function, where the DBMS 12 provides a data control function, including performing data security, integrity, concurrency control and the likein order to effectively control and manage database running and ensure correct and valid data, (4) database creation and maintenance function, including functions such as loading initial data into the database, dump, recovery, and re-organization of the database, and system performance monitoring and analysis, and (5) transmission of the database, where the DBMS 12 provides transmission of processed data to implement communication between a client and the DBMS 12, and the DBMS 12 usually implements the communication in coordination with an operating system.

Figure 2A:
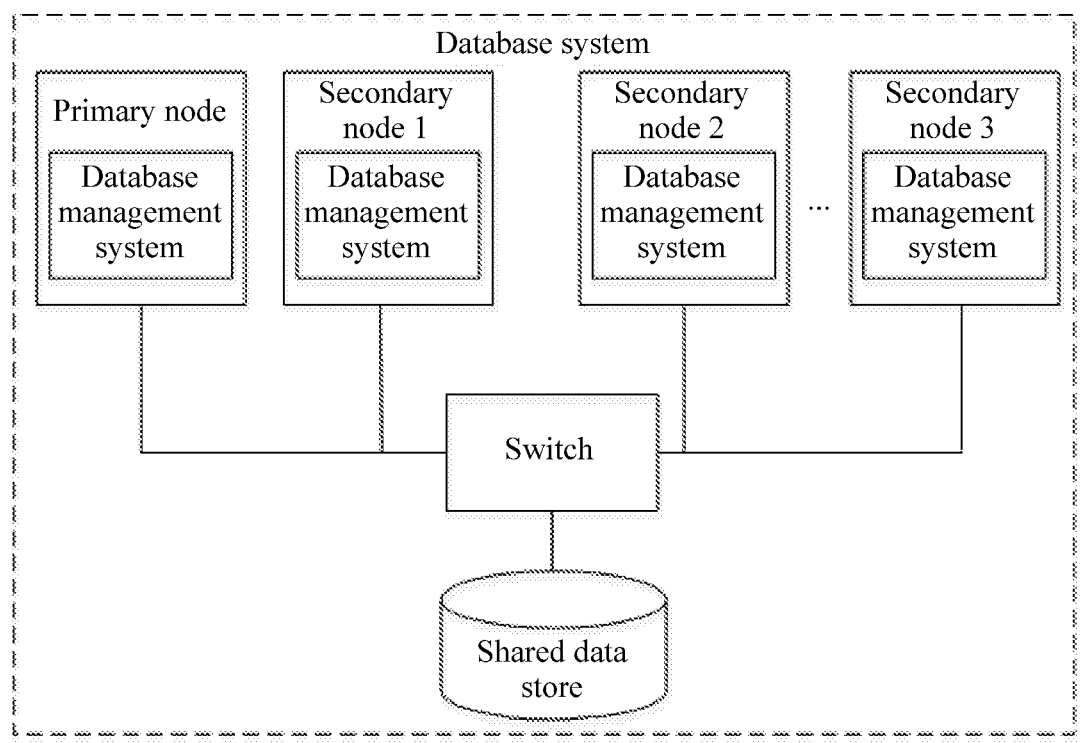
FIG. 2A is a schematic diagram of a cluster-based database system with a shared-storage architecture.

Further, FIG. 2A is a schematic diagram of a cluster-based database system with a shared-storage architecture, including a plurality of nodes (a primary node and secondary nodes 1 to 3 in FIG. 2A). A database management system is deployed on each node, and provides a user with services such as querying and modifying a database. A plurality of database management systems store shared data in a shared data store, and perform read/write operations on data in the data store using a switch. The shared data store may be a shared disk array. The node in the cluster-based database system may be a physical machine such as a database server. The database server may include a plurality of processors. All the processors share resources such as a bus, a memory, and an I/O system. Functions of the database management system may be implemented by executing a program in the memory by one or more processors. The node in the cluster-based database system may be alternatively a virtual machine running on an abstract hardware resource. If the node is a physical machine, the switch is a storage area network (SAN) switch, an Ethernet switch, a fiber channel switch, or another physical switch device. If the node is a virtual machine, the switch is a virtual switch.

Figure 2B:
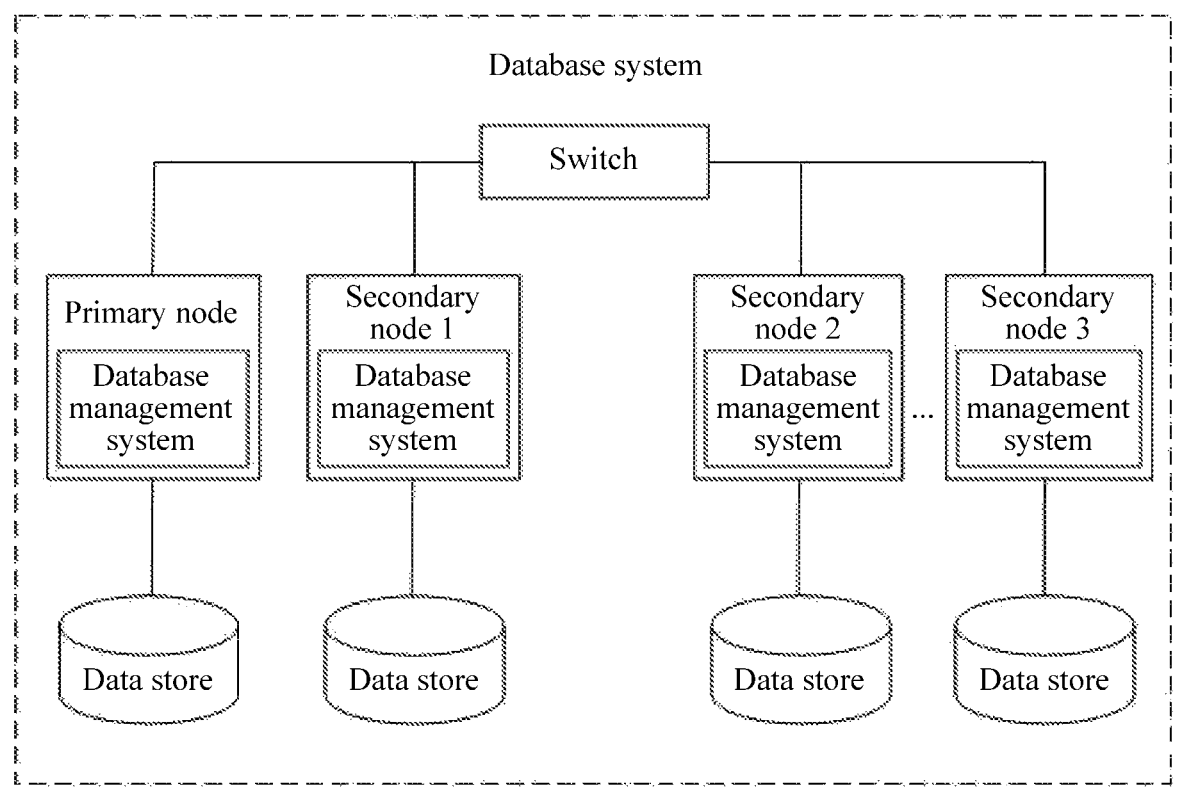
FIG. 2B is a schematic diagram of a cluster-based database system with a shared-nothing architecture.

FIG. 2B is a schematic diagram of a cluster-based database system with a shared-nothing architecture. Each node has an exclusive hardware resource (such as a data store), an operating system, and a database, nodes communicate with each other using a network. In such a system, data is distributed to nodes according to a database model and an application characteristic. A query task is divided into several parts, which are executed concurrently on all the nodes. All the nodes coordinate with each other to perform calculation and serve as an entirety to provide a database service. All communication functions are implemented in a high-wideband network interconnected system. Similar to the cluster-based database system with the shared-storage architecture described in FIG. 2A, the nodes herein may be physical machines or virtual machines.

In the cluster-based database system described in FIG. 2A or FIG. 2B, one node may serve as a primary node, to implement an update operation on a database, such as data insertion, modification, and deletion. Nodes other than the primary node (such as the nodes 1 to 3) in the cluster-based database system serve as secondary nodes, to implement a read operation on data in the database. Such a system is also referred to as a database system with a one-primary-multi-secondary architecture.

Figure 2C:
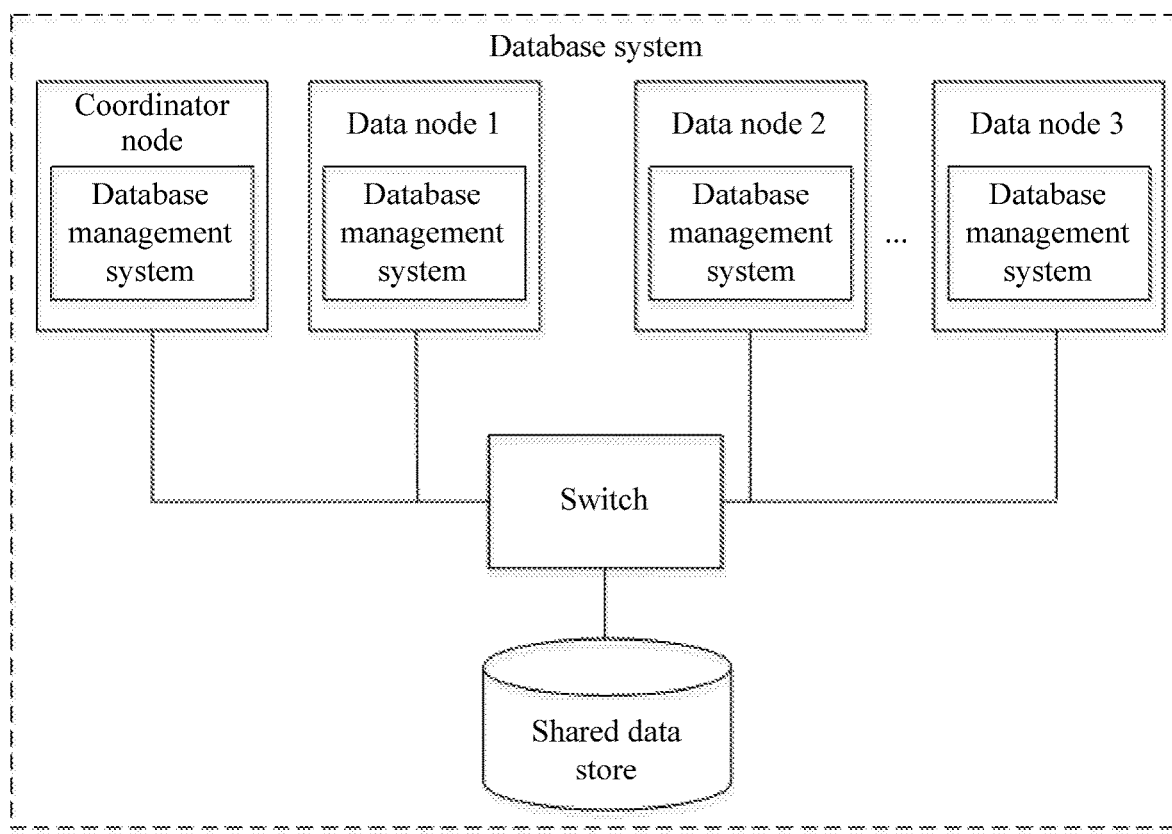
FIG. 2C is a schematic diagram of a cluster-based database system with a multi-write architecture.

FIG. 2C is a schematic diagram of a cluster-based database system with a multi-write architecture. The system includes a shared coordinator node and a data node. The coordinator node and the data node share a disk. The data node is configured to implement a data access function, and the coordinator node is configured to manage global lock resources, distribute a transaction ID to the data node, or the like.

In all the embodiments of the present disclosure, the data store of the database system includes but is not limited to a solid-state disk (SSD), a disk array, or another type of non-transitory computer readable medium. Although the database is not shown in FIG. 2A to 2C, it should be understood that the database is stored in the data store. A person skilled in the art may understand that a database system may include components more or less than those shown in FIG. 2A to 2C, or include components different from those shown in FIG. 2A to 2C. FIG. 2A to 2C merely show components more related to an implementation disclosed in the embodiments of the present disclosure. For example, although a limited quantity of nodes are described in FIG. 2A to 2C, a person skilled in the art may understand that a cluster-based database system may include any quantity of nodes. Functions of database management system of the nodes may be implemented using an appropriate combination of software, hardware and/or firmware on the nodes.

A person skilled in the art may clearly understand, according to description of the embodiments of the present disclosure, that the method in the embodiments of the present disclosure is applied to a database management system. The database management system may be applied to any of cluster-based database systems with the shared-storage architecture shown in FIG. 2A, the cluster-based database system with the shared-nothing architecture shown in FIG. 2B, the cluster-based database system with the multi-write architecture shown in FIG. 2C, or another type of database system.

Further, referring to FIG. 1, when adding a transaction, the DBMS 12 adds a transaction ID of the added transaction to an active transaction list, and when committing a transaction, the DBMS 12 deletes a transaction ID of the committed transaction from the active transaction list such that all current active transactions (that is, not-yet-committed transactions) are recorded in the active transaction list, and only the current active transactions are recorded in the active transaction list. In addition, when adding the transaction and committing the transaction, the DBMS 12 records redo logs, to record a change to the database by the transaction. When the DBMS 12 commits the transaction, a random write into a disk page can be avoided provided that the redo log corresponding to the transaction is written into a disk. In this way, the random write into the page can be substituted with a sequential write performed according to the redo log such that durability of the transaction can be ensured and performance of the database system can be improved. Further, to reduce frequent input/output (I/O) operations on the disk, the DBMS 12 combines actions of writing redo logs corresponding to a plurality of transactions into the disk, and an action of writing a plurality of redo logs into the disk at a time by the DBMS 12 is referred to as group commit.

The DBMS 12 may be in a database server. For example, the database server may be the primary node or the secondary node in FIG. 2A or FIG. 2B. The primary node is configured to implement a data update operation, and the secondary node is configured to implement a data read operation. The DBMS 12 may also be applied to the coordinator node or the data node shown in FIG. 2C. When creating a transaction, the data node requests a transaction ID and a redo log lock from the coordinator node. In response to the request of the data node, the coordinator node distributes the transaction ID and the redo log lock to the data node, and adds the transaction ID of the added transaction to a stored active transaction list. When the data node commits a transaction, the coordinator node deletes the committed transaction from the stored active transaction list. When performing group commit, the data node requests a redo log lock from the coordinator node, and after obtaining the redo log lock, writes redo logs corresponding to a plurality of committed transactions into the disk.

Figure 3:
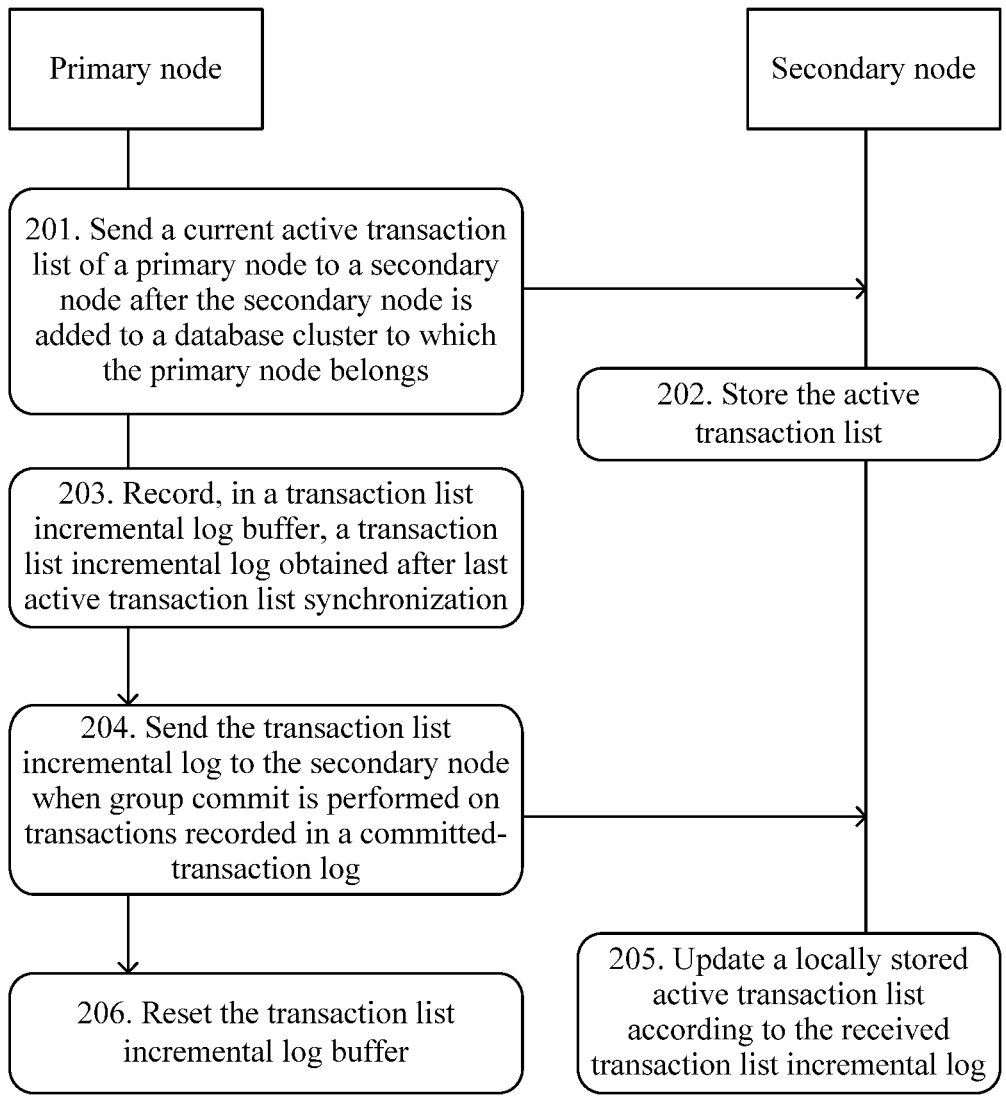
FIG. 3 is a schematic flowchart of an active transaction list synchronization method according to the present application.

The following describes, using a cluster-based database system with a one-primary-multi-secondary architecture as an example, an active transaction list synchronization method provided in an embodiment of the present disclosure. FIG. 3 is a schematic diagram of the active transaction list synchronization method, including the following steps.

Step 201: A primary node sends a current active transaction list of the primary node to a secondary node after the secondary node is added to a database cluster to which the primary node belongs.

Step 202: The secondary node stores the active transaction list.

Step 201 and step 202 describe an implementation of initialization of an active transaction list of the secondary node. It should be noted that, step 201 and step 202 are described for integrity of the solution but are not mandatory steps for implementing this embodiment of the present disclosure. For example, during initialization of the database cluster, there is no active transaction on the primary node. The active transaction list on the primary node is an empty list, and the primary node may not send the active transaction list of the primary node to the secondary node.

Step 203: The primary node records, in a transaction list incremental log buffer, a transaction list incremental log obtained after last active transaction list synchronization.

The active transaction list is used to record a not-yet-committed transaction. The transaction list incremental log is used to indicate a change of a transaction recorded in the active transaction list of the primary node, and includes an added-transaction log indicating that a transaction is added to the active transaction list and a committed-transaction log indicating that a transaction is deleted from the active transaction list. The added-transaction log may include a transaction ID of a transaction and a field representing that a transaction status type is "added (or enabled)". The committed-transaction log may include a transaction ID of a transaction and a field representing that a transaction status type is "committed". When adding a transaction and committing a transaction, the primary node records corresponding transaction list incremental logs in the transaction list incremental log buffer.

Step 204: When performing group commit on transactions recorded in a committed-transaction log, the primary node sends the transaction list incremental log to the secondary node.

There may be one or more secondary nodes. The primary node may send, to a plurality of secondary nodes, the transaction list incremental log of the primary node obtained when the primary node performs group commit.

Step 205: The secondary node updates a locally stored active transaction list according to the received transaction list incremental log.

The secondary node updates the active transaction list in the following manners.

If the transaction list incremental log includes a log indicating that a transaction a is committed, and the active transaction list originally stored by the secondary node includes the transaction a, the secondary node determines that the transaction a has been committed, and deletes the transaction a from the active transaction list. If the transaction list incremental log includes a log indicating that a transaction b is added, and does not include a log indicating that the transaction b is committed, the secondary node determines that the transaction b is in an active state, and adds the transaction b to the active transaction list. If the transaction list incremental log includes a log indicating that a transaction c is added and a log indicating that the transaction c is committed, the secondary node determines that the transaction c is in an inactive state, and does not add the transaction c to the active transaction list.

In the foregoing technical solution, before the primary node sends the transaction list incremental log to the secondary node, an implementation of synchronization between the active transaction list of the secondary node and the active transaction list of the primary node may be performed according to step 201 and step 202, or may be implemented by updating, when last group commit is performed, the active transaction list by the secondary node according to the transaction list incremental log sent by the primary node. Therefore, the primary node sends, to the secondary node, the transaction list incremental log obtained when performing group commit, the secondary node may update the active transaction list of the secondary node according to the transaction list incremental log to be the same as the active transaction list of the primary node. A quantity of transaction list incremental logs obtained when group commit is performed is usually far less than a quantity of active transactions in the active transaction list of the primary node. Therefore, a size of a transaction list incremental log is far less than a size of the entire active transaction list. Active transaction list synchronization is implemented by transmitting the transaction list incremental log, thereby reducing an occupied transmission resource, a transmission time, and a delay of active transaction list synchronization.

In an optional implementation, after step 204, the following is further included Step 206: The primary node resets the transaction list incremental log buffer.

After sending the transaction list incremental log to the secondary node, the primary node resets the transaction list incremental log buffer such that the transaction list incremental log buffer is emptied after each transaction list synchronization, and no transaction list incremental log recorded before group commit (referred to as first-time group commit) is performed exists in the transaction list incremental log buffer, but a transaction list incremental log recorded after group commit is performed is stored. In this case, when next group commit (referred to as second-time group commit) is performed, the primary node sends, according to step 204, the transaction list incremental log indicating that an active transaction list changes after the first-time group commit is performed such that the secondary node can update the local active transaction list according to the transaction list incremental log, and synchronize the active transaction list of the secondary node with an active transaction list obtained when the second-time group commit is performed. Therefore, according to the foregoing solution, after each group commit performed by the primary node, active transaction list synchronization between the primary node and another node in the database cluster can be maintained.

In an optional implementation, the transaction list incremental log buffer is protected using a redo log lock, and a process of writing an added-transaction log into the transaction list incremental log buffer by the primary node is the primary node obtains the redo log lock, locks a redo log buffer, writes, into the redo log buffer, a redo log generated when a transaction is created, locks the transaction list incremental log buffer, and writes an added-transaction log into the transaction list incremental log buffer.

A process of writing a committed-transaction log into the transaction list incremental log buffer by the primary node is the primary node obtains a redo log lock, locks a redo log buffer, writes, into the redo log buffer, a redo log generated when a transaction is committed, locks the transaction list incremental log buffer, and writes a committed-transaction log into the transaction list incremental log buffer.

When the primary node adds a transaction and commits a transaction, redo log locks are required, and each redo log is written into a redo log buffer. In the technical solution of the present application, the transaction list incremental log buffer is configured to be protected using a redo log lock. In a process of obtaining a redo log lock specific to an added transaction and writing a redo log, the primary node may further write the added-transaction log into the transaction list incremental log buffer according to the redo log lock. Therefore, in the process of writing the added-transaction log into the transaction list incremental log buffer by the primary node, no additional lock overheads are caused. Similarly, in a process of obtaining a redo log lock specific to a committed transaction and writing a redo log, the primary node may further write the committed-transaction log into the transaction list incremental log buffer according to the redo log lock. Therefore, in the process of writing the committed-transaction log into the transaction list incremental log buffer by the primary node, no additional lock overheads are caused, either.

Therefore, in the technical solution provided in the present application, the primary node uses an existing redo log lock when recording the transaction list incremental log such that no additional lock overheads are caused. This can effectively mitigate lock permission preemption during recording of the transaction list incremental log, and improve a transaction throughput.

In an optional implementation, when the transaction list incremental log buffer is protected using the redo log lock, a process of sending the transaction list incremental log to at least one secondary node by the primary node is as follows the primary node requests the redo log lock, after obtaining the redo log lock, locks the transaction list incremental log buffer, copies the transaction list incremental log in the transaction list incremental log buffer into a buffer that is not protected using a lock. Then, the primary node sends, to the at least one secondary node, the transaction list incremental log in the buffer that is not protected using a lock.

In the process of directly sending the transaction list incremental log from the transaction list incremental log buffer to the secondary node, the redo log lock needs to be occupied. Therefore, to reduce occupancy of the redo log lock, the primary node first copies, according the redo log lock, the transaction list incremental log in the transaction list incremental log buffer into the buffer that is in a memory and that is not protected using a lock, and then sends, to the secondary node, the transaction list incremental log in the buffer that is not protected using a lock. In the process of sending, to the secondary node, the transaction list incremental log from the buffer that is not protected using a lock, the redo log lock is not occupied. Therefore, according to the solution, occupancy of the redo log lock when the transaction list incremental log is sent can be effectively reduced. This improves a transaction throughput.

In an optional implementation, after copying, according to the redo log lock, the transaction list incremental log in the transaction list incremental log buffer into the buffer that is not protected using a lock, the primary node resets the transaction list incremental log buffer such that the primary node can record in time, in the transaction list incremental log buffer, a transaction list incremental log indicating that a transaction is added and a transaction list incremental log indicating that a transaction is committed, where the transaction list incremental logs are obtained after group commit is performed. This improves a transaction throughput and transaction processing efficiency.

In an optional implementation, after copying, according to the redo log lock, the transaction list incremental log in the transaction list incremental log buffer into the buffer that is not protected using a lock, the primary node may release the redo log lock such that the redo log lock can be obtained in time for another transaction, thereby improving a transaction throughput.

Figure 4A:
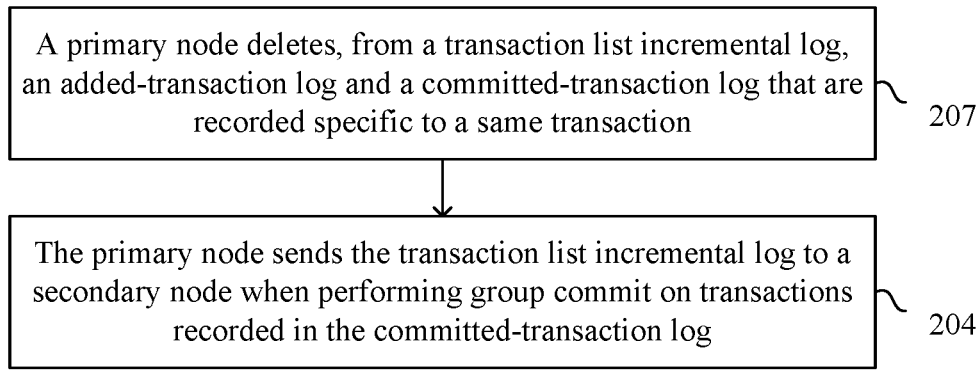
FIG. 4A is another schematic flowchart of an active transaction list synchronization method according to the present application.

In an optional implementation, referring to FIG. 4A, before step 204, the following is further included Step 207: The primary node deletes, from the transaction list incremental log, an added-transaction log and a committed-transaction log that are recorded for a same transaction.

In an example in which both a transaction list incremental log indicating that a transaction a is added and a transaction list incremental log indicating that the transaction a is committed exist in the transaction list incremental log buffer, that the primary node adds the transaction a before performing group commit indicates that the transaction a has not yet been created during last group commit. Therefore, the transaction a does not exist in the active transaction list of the secondary node. That the primary node commits the transaction a before performing group commit indicates that the transaction a has been committed, and the transaction a is no longer an active transaction, and does not appear in the active transaction list. Therefore, if there are the transaction list incremental log indicating that the transaction a is added and the transaction list incremental log indicating that the transaction a is committed, the transaction a is neither in an active transaction list of the secondary node before updating nor in an updated active transaction list of the secondary node. The transaction a does not affect the active transaction list of the secondary node.

Step 207 may include but is not limited to the following implementations first, the primary node may retrieve, in the transaction list incremental log buffer at any time of group commit, the added-transaction log and the committed-transaction log that are recorded for the same transaction, and then deletes the added-transaction log and the committed-transaction log. Second, when the primary node performs group commit, before sending the transaction list incremental log from the transaction list incremental log buffer to the secondary node, the primary node first retrieves the added-transaction log and the committed-transaction log that are recorded for the same transaction, deletes the added-transaction log and the committed-transaction log, and sends, to the secondary node, the transaction list incremental log obtained after the delete operation is performed. Third, before copying, according to the redo log lock, the transaction list incremental log from the transaction list incremental log buffer into the buffer, mentioned in the foregoing embodiment, that is not protected using a lock, the primary node first retrieves the added-transaction log and the committed-transaction log that are recorded for the same transaction, deletes the added-transaction log and the committed-transaction log, and copies the transaction list incremental log into the buffer that is not protected using a lock. Fourth, before sending, to the secondary node, the transaction list incremental log from the buffer that is not protected using a lock, the primary node first retrieves the added-transaction log and the committed-transaction log that are recorded for the same transaction, deletes the added-transaction log and the committed-transaction log, and sends, to the secondary node from the buffer that is not protected using a lock, the transaction list incremental log obtained after the delete operation is performed.

In the technical solution, deleting, by the primary node, the added-transaction log and the committed-transaction log that are recorded for the same transaction does not affect active transaction list synchronization between nodes. In addition, a log transmission amount can be significantly reduced, transmission resource consumption is reduced, and a time consumed for transaction list synchronization is shortened.

Figure 4B:
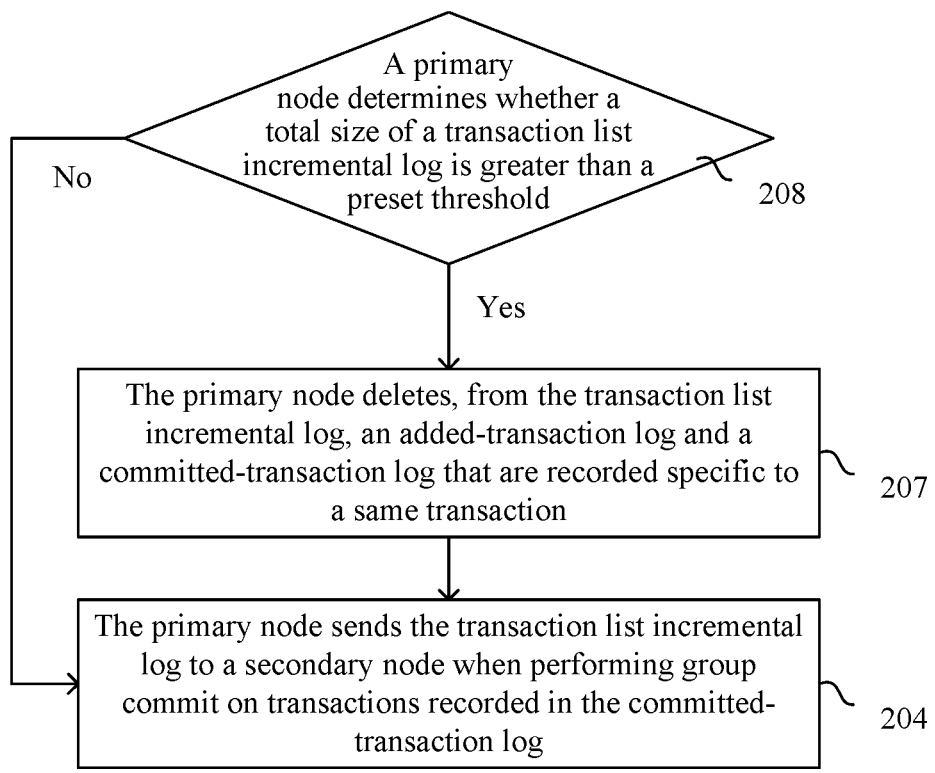
FIG. 4B is still another schematic flowchart of an active transaction list synchronization method according to the present application.

In another optional implementation, still referring to FIG. 4B, before step 204, the following is further included Step 208: The primary node determines whether a total size of the transaction list incremental log is greater than a preset threshold. If the total size is greater than the preset threshold, step 207 is performed, and step 204 is performed after step 207. If the total size of the transaction list incremental log is not greater than the preset threshold, step 204 is performed.

A time needs to be consumed when the primary node retrieves the added-transaction log and the committed-transaction log that are recorded for the same transaction. If the total size of the transaction list incremental log is not greater than the preset threshold and is a relatively small value, the primary node may not perform a retrieval operation. This reduces calculation resource consumption. On the contrary, the primary node performs step 207 only when the total size of the transaction list incremental log is greater than the preset threshold and is a relatively large value, and deletes the added-transaction log and the committed-transaction log that are recorded for the same transaction in order to reduce a log transmission amount.

It should be noted that, the method described in step 201 to step 208 may also be applied to the cluster-based database system with a multi-write architecture shown in FIG. 2C. In the cluster-based database system with a multi-write architecture, step 201 to step 204 and step 206 to step 208 are performed by a coordinator node in the cluster-based database system with a multi-write architecture, and step 205 is performed by a data node.

A process of performing step 203 is when creating a transaction, the data node requests a transaction ID and a redo log lock from the coordinator node, after distributing the transaction ID and the redo log lock to the data node, the coordinator node adds the transaction ID to a locally-stored global active transaction list and records, in the transaction list incremental log buffer, a log indicating that the transaction is created. When committing a transaction, the data node requests the redo log lock from the coordinator node. After distributing the redo log lock to the data node, the coordinator node deletes the transaction ID of the added transaction from the locally-stored global active transaction list, and records, in the transaction list incremental log buffer, a log indicating that the transaction is committed.

A process of performing step 204 is when performing group commit, the data node requests a redo log lock from the coordinator node, after distributing the redo log lock to the data node, the coordinator node sends the transaction list incremental log to all data nodes such that the data nodes keep, according to the transaction list incremental log, the locally-stored active transaction list to be the same as a global active transaction list stored in the coordinator node.

In the cluster-based database system with a multi-write architecture shown in FIG. 2C, an implementation of step 205 to step 208 is the same as an implementation in the cluster-based database system with a primary-secondary architecture shown in FIG. 2A or FIG. 2B. Details are not repeated herein.

Figure 5:
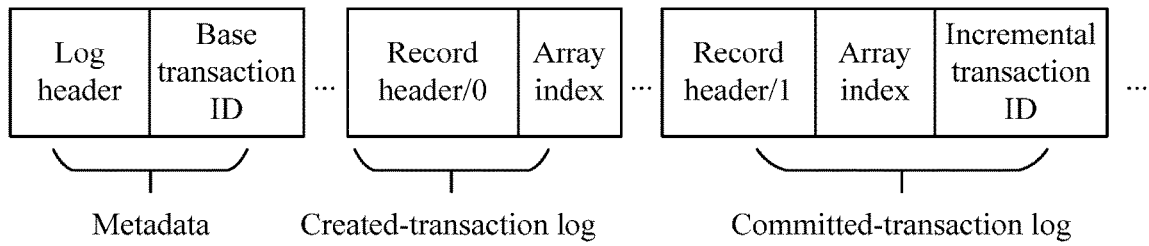
FIG. 5 is a schematic diagram of a structure of a transaction list incremental log according to the present application.

FIG. 5 shows a possible implementation of a structure of a transaction list incremental log in the present application. A plurality of transaction list incremental logs in a transaction list incremental log buffer are referred to as a group of transaction list incremental logs. A group of transaction list incremental logs include metadata and one or more transaction list incremental logs. The metadata of the group of transaction list incremental logs includes a log header and a base transaction ID. The log header may occupy one byte, and is a number of the group of transaction list incremental logs. The base transaction ID may occupy eight bytes, and is used to represent a $1^{st}$ transaction ID of an added transaction in the group of transaction list incremental logs. For example, if a maximum transaction ID of transactions in an original transaction list is 2119, the base transaction ID in the transaction list incremental logs is 2200. Each transaction list incremental log includes a record header representing a transaction change type and an array index of a transaction in a transaction list. For example, the record header field may occupy one bit, a record header "0" indicates that a transaction is committed, and a record header "1" indicates that a transaction is added. The array index may occupy (7+8*N) bits, where N is a maximum quantity of concurrent transactions in a database system. The array index indicates an offset between a transaction and a $1^{st}$ transaction in the transaction list. For an added-transaction log, an incremental transaction ID field occupying 8*N bits may be further included. The incremental transaction ID field indicates a difference between a transaction ID of the transaction and the base transaction ID.

Figure 6A:
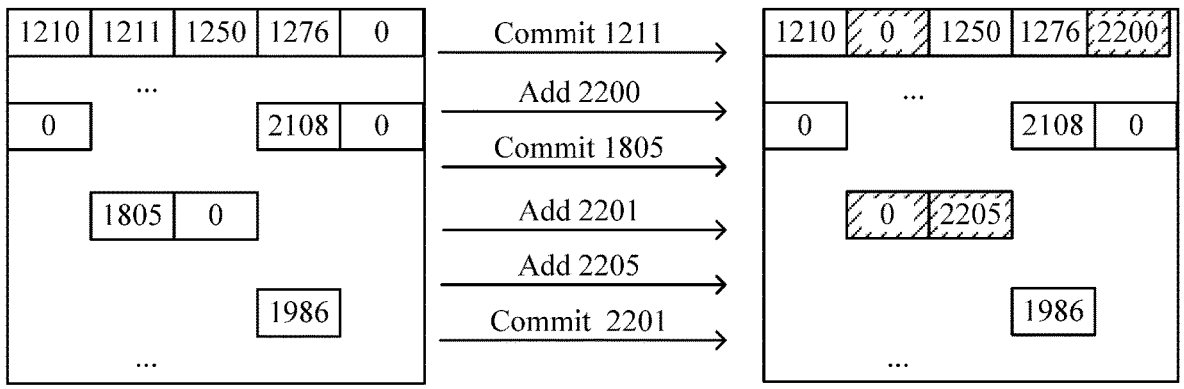
FIG. 6A to FIG. 6E are schematic diagrams of processes of active transaction list synchronization according to the present application.

FIG. 6A shows a change, existing when a primary node creates a transaction and commits a transaction, of an active transaction list of the primary node. Each box in the figure indicates an active transaction, a number in the box is a number of the active transaction. A left part of FIG. 6A shows an original active transaction list of the primary node (or an active transaction list obtained after last active transaction list synchronization). A right part of FIG. 6A shows an active transaction list, obtained when current group commit is performed, of the primary node, where "0" indicates that the location is vacant, and slash lines are used to indicate a location at which a change occurs in the transaction list.

Figure 6B:
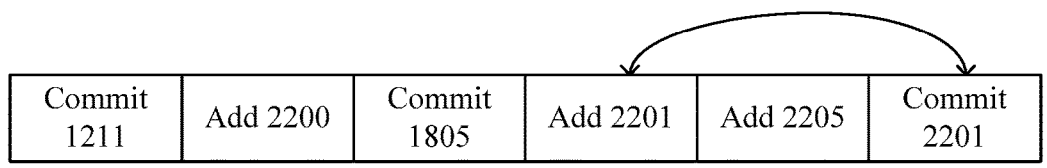

FIG. 6B shows transaction list incremental logs recorded by the primary node between two times of active transaction list synchronization.

Figure 6C:
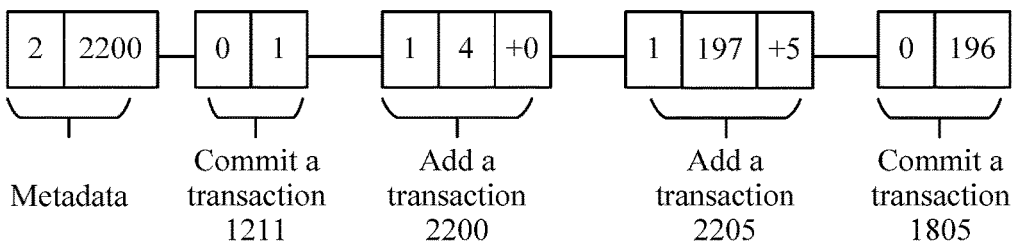

FIG. 6C shows transaction list incremental logs generated after step 207 of deleting an added-transaction log and a committed-transaction log specific to a same transaction is performed on the transaction list incremental logs shown in FIG. 6B, for example, deleting a log indicating that a transaction 2201 is added and a log indicating that the transaction 2201 is committed in FIG. 6B. The transaction list incremental logs described in FIG. 6C are represented using the structure shown in FIG. 5.

For example, for a transaction 1805 in the active transaction list shown in the left part of FIG. 6A, it is assumed that an offset between the transaction 1805 and a $1^{st}$ transaction 1210 in the transaction list is 196. With reference to the structure of the transaction list incremental log shown in FIG. 5, meanings of fields in FIG. 6C are as follows a metadata field, where a number of the group of transaction list incremental logs is 2, and the base transaction ID is 2200. A field "0" "1" following the metadata field indicates a committed-transaction log. An offset of a committed transaction is 1, and it may be determined that the committed transaction is a transaction 1211 in the active transaction list in the left part of FIG. 6A. A further following field "1" "4" "+0" indicates an added-transaction log. A location of an added transaction in the transaction list is a location with an offset 4 from the transaction 1210, that is, a last location in a $1^{st}$ row of the active transaction list in the left part of FIG. 6A. A transaction ID of the added transaction is the base transaction ID 2200 plus 0, that is, 2200. A still further following field "1" "197" "+5" indicates an added-transaction log. A location of an added transaction in the transaction list is a location with an offset 197 from the transaction 1210, that is, a first location following the transaction 1805 in the active transaction list in the left part of FIG. 6A. A transaction ID of the added transaction is the base transaction ID 2200 plus 5, that is, 2205. A yet further field "0" "196" indicates a committed-transaction log. An offset of a committed transaction is 196, and it may be determined that the committed transaction is the transaction 1805 in the active transaction list in the left part of FIG. 6A.

Figure 6D:
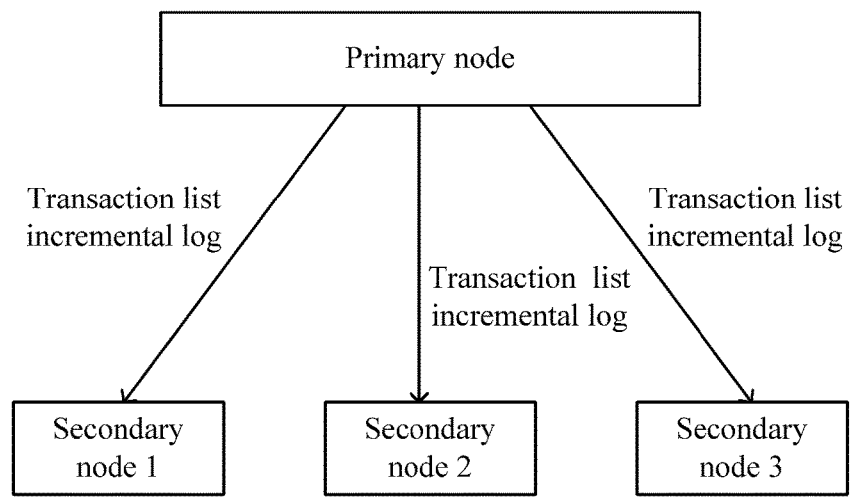

FIG. 6D shows that the primary node sends, to a plurality of secondary nodes in a database cluster, the transaction list incremental log shown in FIG. 6C.

Figure 6E:
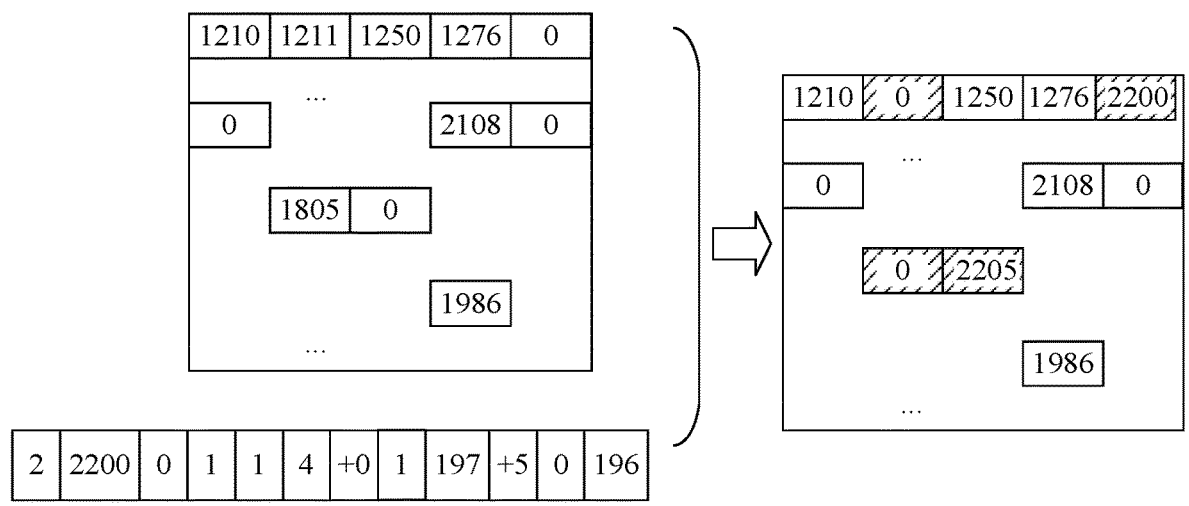

FIG. 6E is a schematic diagram of updating, by any secondary node according to the transaction list incremental log shown in FIG. 6C, an active transaction list stored in the secondary node. The original active transaction list of the secondary node shown in a left upper part of FIG. 6E is the same as the original active transaction list of the primary node shown in the left part of FIG. 6A, and an updated active transaction list of the secondary node shown in a right part of FIG. 6E is the same as the active transaction list, shown in the right part of FIG. 6A, obtained when the primary node performs group commit.

It can be learned that, according to the technical solution in this embodiment of the present disclosure, active transaction list synchronization between the primary node and the secondary node can be implemented after each group commit is performed.

Figure 7:
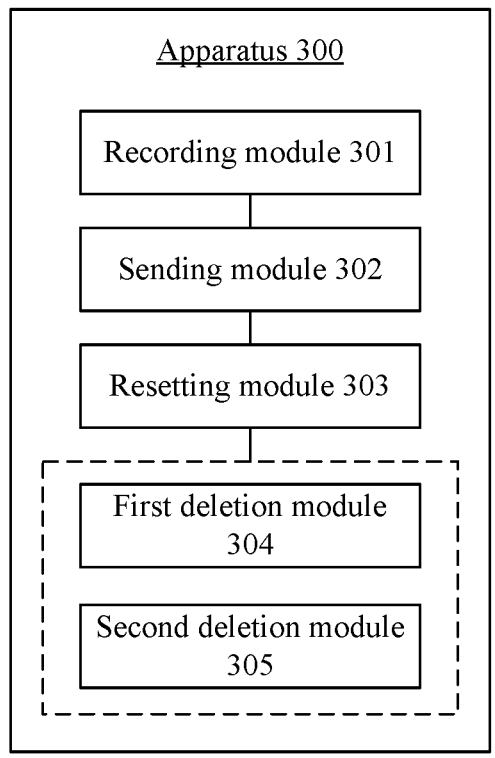
FIG. 7 is a schematic structural diagram of an active transaction list synchronization apparatus according to the present application.

FIG. 7 shows an active transaction list synchronization apparatus 300 according to the present application, where the apparatus 300 is configured to implement a function of the primary node or the coordinator node in the active transaction list synchronization method in the foregoing embodiment of the present application, and includes a recording module 301 configured to record, in a transaction list incremental log buffer, a transaction list incremental log obtained after last active transaction list synchronization, where the transaction list incremental log is used to indicate a change of a transaction recorded in an active transaction list of the apparatus and includes an added-transaction log indicating that a transaction is added to the active transaction list and a committed-transaction log indicating that a transaction is deleted from the active transaction list, and the active transaction list is used to record a not-yet-committed transaction, and a sending module 302 configured to send the transaction list incremental log to at least one second node when group commit is performed on transactions recorded in the committed-transaction log such that the at least one second node updates, according to the received transaction list incremental log, an active transaction list stored in the at least one second node.

In an optional implementation, the transaction list incremental log buffer is protected using a redo log lock, and the recording module 301 is configured to obtain the redo log lock, lock the transaction list incremental log buffer, and record the added-transaction log and the committed transaction log in the transaction list incremental log buffer.

In an optional implementation, the sending module 302 is configured to obtain the redo log lock, lock the transaction list incremental log buffer, copy the transaction list incremental log in the transaction list incremental log buffer into a buffer that is not protected using a lock, and send, to the at least one second node, the transaction list incremental log in the buffer that is not protected using a lock.

In an optional implementation, the apparatus 300 further includes a resetting module 303 configured to reset the transaction list incremental log buffer after the sending module 302 copies the transaction list incremental log in the transaction list incremental log buffer into the buffer that is not protected using a lock.

In an optional implementation, the apparatus 300 further includes a first deletion module 304 configured to before the sending module 302 sends the transaction list incremental log to the at least one second node, delete, from the transaction list incremental log, an added-transaction log and a committed-transaction log that are recorded for a same transaction.

In an optional implementation, the apparatus 300 further includes a second deletion module 305 configured to before the sending module 302 sends the transaction list incremental log to the at least one second node, determine whether a total size of the transaction list incremental log is greater than a preset threshold, and if the total size of the transaction list incremental log is greater than the preset threshold, delete, from the transaction list incremental log, an added-transaction log and a committed-transaction log that are recorded for a same transaction.

In an optional implementation, the sending module 302 is further configured to the apparatus sends the active transaction list of the apparatus to the second node when the second node is added to a database cluster to which the apparatus belongs.

Division of the modules of the apparatus 300 in this embodiment of the present application is an example, and is only logic function division or may be other division in an embodiment. In addition, function modules in the embodiments of the present application may be integrated into one processor or may exist alone physically, or two or more modules may be integrated into one module. The integrated module may be implemented in a form of hardware, or may be implemented in a form of a software function module.

Figure 8:
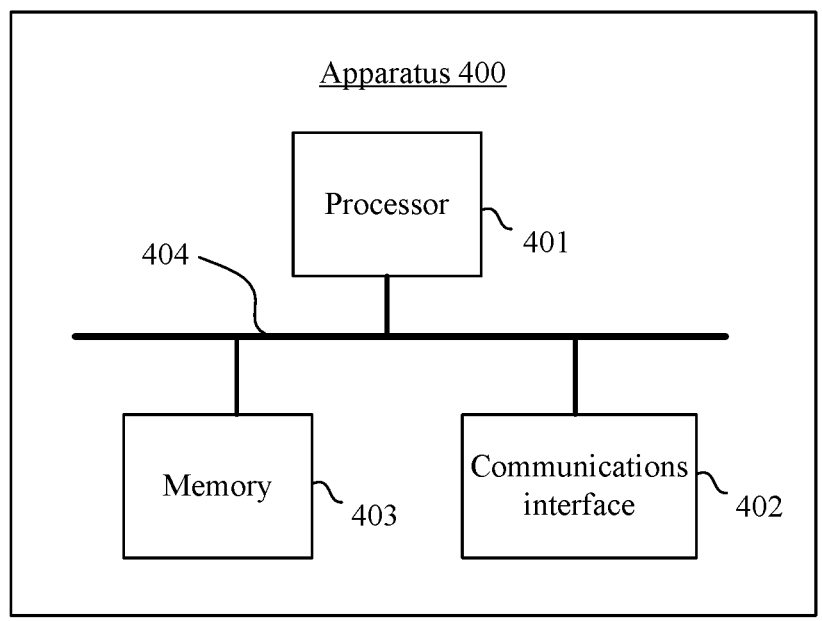
FIG. 8 is another schematic structural diagram of an active transaction list synchronization apparatus according to the present application.

When the integrated module may be implemented in the form of hardware, as shown in FIG. 8, an active transaction list synchronization apparatus 400 may include a processor 401. Hardware of an entity corresponding to the recording module 301, the resetting module 303, the first deletion module 304, and the second deletion module 305 may be the processor 401. The processor 401 may be a central processing module (CPU), a digital processing module, or the like. The active transaction list synchronization apparatus 400 may further include a communications interface 402. Hardware of an entity corresponding to the sending module 302 may be the communications interface 402. The active transaction list synchronization apparatus 400 sends, using the communications interface 402, a transaction list incremental log to another node in a database cluster to which the apparatus 400 belongs. The active transaction list synchronization apparatus 400 further includes a memory 403 configured to store a program executed by the processor 401. The memory 403 may be a non-volatile memory such as a hard disk drive (HDD) or a solid-state drive (SSD), or may be a volatile memory such as a random-access memory (RAM). The memory 403 is any other medium that can be configured to carry or store expected program code in a form of an instruction or a data structure and that can be accessed in a computer, but no limitation is set thereto.

The processor 401 is configured to execute the program code stored in the memory 403, and is configured to execute the method in any embodiment shown in FIG. 3, FIG. 4A, and FIG. 4B. Reference may be made to the method described in the embodiments shown in FIG. 3, FIG. 4A, and FIG. 4B. Details are not repeated herein in the present application.

In this embodiment of the present application, a specific connection medium between the communications interface 402, the processor 401, and the memory 403 is not limited. In this embodiment of the present application, in FIG. 8, the memory 403, the processor 401, and the communications interface 402 are connected using a bus 404. The bus is represented using a bold line in FIG. 8. A manner of connection between other components is described merely as an example and is not limited. The bus may be divided into an address bus, a data bus, a control bus, and the like. For ease of representation, the bus is represented using only a bold line in FIG. 8. However, this does not mean that there is only one bus or one type of bus.

An embodiment of the present disclosure further provides a computer-readable storage medium configured to store a computer software instruction used to execute operations that the processor 401 needs to execute. The computer software instruction includes a program used to execute the operations that the processor needs to execute.

Figure 9:
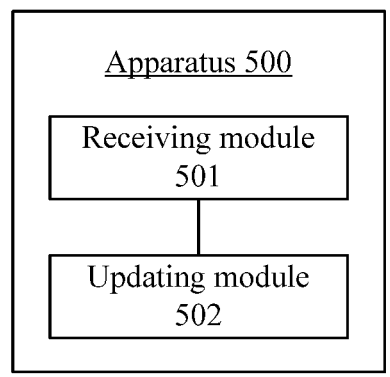
FIG. 9 is a schematic structural diagram of another active transaction list synchronization apparatus according to the present application.

FIG. 9 shows an active transaction list synchronization apparatus 500 according to an embodiment of the present disclosure, where the apparatus 500 is configured to implement a function of the secondary node or the data node in the active transaction list synchronization method in the foregoing embodiment of the present application, and includes a receiving module 501 configured to receive a transaction list incremental log obtained after last active transaction list synchronization and sent by a first node, where the transaction list incremental log is used to indicate a change of a transaction recorded in an active transaction list of the first node and includes an added-transaction log indicating that a transaction is added to the active transaction list and a committed-transaction log indicating that a transaction is deleted from the active transaction list, and the active transaction list is used to record a not-yet-committed transaction, and an updating module 502 configured to update a local active transaction list according to the transaction list incremental log.

In an optional implementation, the updating module 502 is configured to add a first transaction to the active transaction list if the transaction list incremental log includes a log indicating that the first transaction is added but does not include a log indicating that the first transaction is committed, and/or delete a second transaction from the active transaction list if the active transaction list includes the second transaction and the transaction list incremental log includes a log indicating that the second transaction is committed.

Division of the modules of the apparatus 500 in this embodiment of the present application is an example, and is only logic function division or may be other division in an embodiment. In addition, function modules in the embodiments of the present application may be integrated into one processor or may exist alone physically, or two or more modules may be integrated into one module. The integrated module may be implemented in a form of hardware, or may be implemented in a form of a software function module.

When the integrated module may be implemented in a form of hardware, an active transaction list synchronization apparatus may include a processor, and hardware of an entity corresponding to the updating module 502 may be the processor. The active transaction list synchronization apparatus may further include a communications interface. Hardware of an entity corresponding to the receiving module 501 may be the communications interface. The active transaction list synchronization apparatus receives, using the communications interface, a transaction list incremental log sent by a primary node or a coordinator node. The active transaction list synchronization apparatus 500 further includes a memory configured to store a program executed by the processor. Implementations of the processor, the communications interface, and the memory have been described in the embodiment shown in FIG. 8. Details are not repeated herein.

An embodiment of the present disclosure further provides a computer-readable storage medium configured to store a computer software instruction used to execute operations that the processor needs to execute. The computer software instruction includes a program used to execute the operations that the processor needs to execute.

A person skilled in the art should understand that the embodiments of the present application may be provided as a method, a system, or a computer program product. Therefore, the present application may use a form of hardware only embodiments, software only embodiments, or embodiments with a combination of software and hardware. Moreover, the present application may use a form of a computer program product that is implemented on one or more computer-usable storage media (including but not limited to a disk memory, a compact disc-read only memory (CD-ROM), an optical memory, and the like) that include computer usable program code.

The present application is described with reference to the flowcharts and/or block diagrams of the method, the device (system), and the computer program product according to the present application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine such that the instructions executed by a computer or a processor of the other programmable data processing device generate an apparatus for implementing a specified function in one or more processes in the flowcharts and/or in one or more blocks in the block diagrams.

These computer program instructions may be stored in a computer-readable memory that can instruct the computer or another programmable data processing device to work in a specified manner such that the instructions stored in the computer-readable memory generate an artifact that includes an instruction apparatus. The instruction apparatus implements a specified function in one or more processes in the flowcharts and/or in one or more blocks in the block diagrams.

These computer program instructions may be loaded onto a computer or another programmable data processing device such that a series of operations and steps are performed on the computer or the other programmable device, thereby generating computer-implemented processing. Therefore, the instructions executed on the computer or the other programmable device provides steps for implementing a specified function in one or more processes in the flowcharts and/or in one or more blocks in the block diagrams.

Obviously, a person skilled in the art can make various modifications and variations to the present application without departing from the scope of the present application. The present application is intended to cover these modifications and variations of the present application provided that they fall within the scope of protection defined by the following claims and their equivalent technologies.

The invention claimed is:

1. An active transaction list synchronization method implemented by a first node, comprising:
   obtaining a transaction list incremental log after a last active transaction list synchronization;
   recording, in a transaction list incremental log buffer, the transaction list incremental log responsive to obtaining the transaction list incremental log, wherein the transaction list incremental log comprises a log that indicates a change of a transaction recorded in an active transaction list of the first node, and wherein the transaction list incremental log comprises:
      an added-transaction log that indicates the transaction is added to the active transaction list; and
      a committed-transaction log that indicates the transaction is deleted from the active transaction list, wherein the active transaction list of the first node records a not-yet-committed transaction; and
   sending the transaction list incremental log to a second node when performing group commit on at least one transaction recorded in the committed-transaction log.

2. The active transaction list synchronization method of claim 1, further comprising protecting the transaction list incremental log buffer using a redo log lock, and wherein recording the transaction list incremental log further comprises:
   obtaining the redo log lock;
   locking the transaction list incremental log buffer after obtaining the redo log lock;
   recording the added-transaction log in the transaction list incremental log buffer; and
   recording the committed-transaction log in the transaction list incremental log buffer.

3. The active transaction list synchronization method of claim 2, wherein sending the transaction list incremental log to the second node comprises:
   obtaining the redo log lock;
   locking the transaction list incremental log buffer after obtaining the redo log lock;
   copying the transaction list incremental log in the transaction list incremental log buffer into a buffer that is not lock protected; and
   sending, to the second node, the transaction list incremental log in the buffer that is not lock protected.

4. The active transaction list synchronization method of claim 3, wherein copying the transaction list incremental log further comprises resetting the transaction list incremental log buffer.

5. The active transaction list synchronization method of claim 1, wherein before sending the transaction list incremental log to the second node, the method further comprises:
   deleting, from the transaction list incremental log, the added-transaction log; and
   deleting, from the transaction list incremental log, the committed-transaction log that is recorded for a same transaction.

6. The active transaction list synchronization method of claim 1, wherein before sending the transaction list incremental log to the second node, the method further comprises:
   deleting, from the transaction list incremental log, the added-transaction log that is recorded for a same transaction; and
   deleting, from the transaction list incremental log, the committed-transaction log that is recorded for a same transaction, wherein the total size of the transaction list incremental log is greater than the preset threshold.

7. The active transaction list synchronization method of claim 1, wherein before sending the transaction list incremental log to the second node, the method further comprises sending the active transaction list of the first node to the second node, and wherein the second node is added to a database cluster to which the first node belongs.

8. An active transaction list synchronization apparatus, comprising:
   a processor; and
   a memory coupled to the processor and storing one or more programs that, when executed by the processor, cause the active transaction list synchronization apparatus to be configured to:
      obtain a transaction list incremental log after a last active transaction list synchronization;
      record, in a transaction list incremental log buffer, the transaction list incremental log, wherein the transaction list incremental log comprises a log indicating a change of a transaction recorded in an active transaction list of the apparatus, and wherein the transaction list incremental log comprises:
         an added-transaction log that indicates the transaction is added to the active transaction list; and
         a committed-transaction log that indicates the transaction is deleted from the active transaction list, wherein the active transaction list of the first node records a not-yet-committed transaction; and
      send the log to a second node when group commit is performed on transactions recorded in the committed-transaction log.

9. The active transaction list synchronization apparatus of claim 8, wherein the transaction list incremental log buffer is protected by using a redo log lock, and wherein the programs further cause the active transaction list synchronization apparatus to be configured to:
   obtain the redo log lock;
   lock the transaction list incremental log buffer after obtaining the redo log lock;
   record the added-transaction log in the transaction list incremental log buffer; and
   record the committed-transaction log in the transaction list incremental log buffer.

10. The active transaction list synchronization apparatus of claim 9, wherein the programs further cause the active transaction list synchronization apparatus to be configured to:
    obtain the redo log lock;
    lock the transaction list incremental log buffer after obtaining the redo log lock;
    copy the transaction list incremental log in the transaction list incremental log buffer into a buffer that is not lock protected; and
    send, to the second node, the transaction list incremental log in the buffer that is not lock protected.

11. The active transaction list synchronization apparatus of claim 10, wherein the programs further cause the active transaction list synchronization apparatus to be configured to reset the transaction list incremental log buffer after copying the transaction list incremental log.

12. The active transaction list synchronization apparatus of claim 8, wherein the programs further cause the active transaction list synchronization apparatus to be configured to:

delete, from the transaction list incremental log, the added-transaction log; and delete, from the transaction incremental log, the committed-transaction log that is recorded for the same transaction before sending the transaction list incremental log to the second node.

13. The active transaction list synchronization apparatus of claim 8, wherein the programs further cause the active transaction list synchronization apparatus to be configured to:

delete, from the transaction list incremental log, the added-transaction log that is recorded for a same transaction; and delete, from the transaction list incremental log, the committed-transaction log that is recorded for the same transaction, wherein the total size of the transaction list incremental log is greater than the preset threshold.

14. The active transaction list synchronization apparatus of claim 8, wherein the programs further cause the active transaction list synchronization apparatus to be configured to send the active transaction list to the second node and wherein the second node is added to a database cluster to which the active transaction list synchronization apparatus belongs.

15. An active transaction list synchronization apparatus, comprising:

a memory storing instructions;

a processor coupled to the memory and configured to execute the instructions, wherein the instructions cause the processor to:

receive a transaction list incremental log from a first node, wherein the transaction list incremental log is received after a last active transaction list synchronization, wherein the transaction list incremental log comprises a log indicating a change of the transaction recorded in the active transaction list of the first node, and wherein the transaction list incremental log comprises:

an added-transaction log that indicates the transaction is added to the active transaction list; and a committed-transaction log that indicates the transaction is deleted from the active transaction list, wherein the active transaction list of the first node records a not-yet-committed transaction; and update a local active transaction list according to the transaction list incremental log.

16. The active transaction list synchronization apparatus of claim 15, wherein the instructions further cause the processor to add a first transaction to the active transaction list, and wherein the transaction list incremental log comprises a log that indicates the first transaction is added and does not indicate that the first transaction is committed.

17. The active transaction list synchronization apparatus of claim 15, wherein the instructions further cause the processor to delete a second transaction from the active transaction list, wherein the active transaction list comprises the second transaction, and wherein the transaction list incremental log comprises a log that indicates the second transaction is committed.

18. The active transaction list synchronization apparatus of claim 15, wherein the instructions further cause the processor to receive an active transaction list from the first node before receiving the transaction list incremental log from the first node.

19. The active transaction list synchronization apparatus of claim 15, wherein the instructions further cause the processor to receive the transaction list incremental log in a transaction list incremental log buffer that is not lock protected.

20. The active transaction list synchronization apparatus of claim 15, wherein the instructions further cause the processor to receive the transaction list incremental log from the first node after a second node is added to a database cluster comprising the first node.

* * * * *